United States Patent [19]
Brown et al.

[11] Patent Number: 5,707,443
[45] Date of Patent: Jan. 13, 1998

US005707443A

[54] GROUTING MATERIALS AND THEIR USE

[75] Inventors: David John Brown, Poole; Stephen Geoffrey Higson, Cheshire, both of United Kingdom

[73] Assignee: British Nuclear Fuels, United Kingdom

[21] Appl. No.: 505,199

[22] PCT Filed: Aug. 25, 1994

[86] PCT No.: PCT/GB94/01861

§ 371 Date: Oct. 11, 1995

§ 102(e) Date: Oct. 11, 1995

[87] PCT Pub. No.: WO95/07887

PCT Pub. Date: Mar. 23, 1995

[30] Foreign Application Priority Data

Sep. 16, 1993 [GB] United Kingdom ............ 9319196

[51] Int. Cl.$^6$ .................... C04B 18/04; C04B 14/26; C04B 24/04; C04B 24/10

[52] U.S. Cl. .................... 106/713; 106/694; 106/695; 106/696; 106/697; 106/718; 106/719; 106/724; 106/726; 106/773; 106/774; 106/778; 106/780; 106/802; 106/805; 106/810; 106/811; 106/728; 106/816; 106/819; 106/823; 524/2; 524/650; 405/266; 588/252; 588/257

[58] Field of Search .................... 106/696, 694, 106/718, 724, 726, 803, 811, 773, 774, 784, 816, 820, 695, 697, 719, 778, 780, 802, 805, 810, 728, 819, 823; 524/2, 650; 405/266; 588/252, 257

[56] References Cited

U.S. PATENT DOCUMENTS 3,579,366  5/1971  Rehmar .................... 106/820
5,133,806  7/1992  Sakamoto et al. .................... 106/696

FOREIGN PATENT DOCUMENTS 1 531 057  11/1978  United Kingdom .

*Primary Examiner*—Michael Marcheschi
*Attorney, Agent, or Firm*—Nixon & Vanderhye

[57] ABSTRACT

A grouting material which is self-dispersing when brought into contact with a volume of water containing liquor or slurry and is settable to a solid mass after such dispersion, the material being in the form of self-dispersing granules or pellets and comprising a blend of component (A): a cementive constituent forming from 10 per cent to 95 per cent by weight of the composition; component (B): a dispersing constituent forming from 2 per cent to 75 per cent by weight of the composition; optional component (C): a swelling constituent which forms from 0 per cent to 50 per cent by weight of the composition; and component (D): a binder constituent which forms from 0.1 per cent to 10 per cent by weight of the composition; the percentages of components A, B, C and D adding to 100 per cent.

11 Claims, No Drawings

GROUTING MATERIALS AND THEIR USE

This application is a 371 of International Application No. PCT/GB94/01861 filed Aug. 25, 1994.

GROUTING MATERIALS AND THEIR USE

The present invention relates to grouting materials and methods for their use.

Grouting or cementing materials are commonly employed to form solid rigid masses by addition of powders of the material to water. Such materials may be employed not only for the production of concrete for widely used building structures but also in specialised applications such as the encapsulation in containers of hazardous substances such as radioactive wastes.

It is usual for the grouting material to be mixed as soon as it is added to water. Such mixing can be time consuming and costly and in specialised applications requires significant quality control and care. For example, where mixing for encapsulation of radioactive waste liquors and slurries is carried out it has in some cases been necessary to mix the cementing material with the waste liquor or slurry. Decontamination of the mixing equipment is required in such cases and this is hazardous as well as time consuming and costly.

The present invention provides a novel grouting material, and a method of using the same, which allows addition of the material to a water-containing liquor or slurry to form a solid mass therein, eg to encapsulate the same, without the need for the conventional mixing step.

According to the present invention in a first aspect there is provided a grouting material which is self-dispersing when brought into contact with a volume of water containing liquor or slurry and is settable to a solid mass after such dispersion, the material comprising a composition, Composition X, which comprises a blend of:

Component A: a cementive constituent forming from 10 percent to 95 percent by weight of the composition;

Component B: a disintegrating mechanism promoting constituent forming from 2 percent to 75 percent by weight of the composition;

Component C: an optional swelling constituent which forms from 0 percent to 50 percent by weight of the composition;

Component D: a binder constituent which forms from 0.1 percent to 10 percent by weight of the composition.

The percentages of components A, B, C and D add to 100 percent.

Desirably, Components A, B and C each comprise powders which preferably have mean particle diameters less than 25 micrometers, especially less than 10 micrometers.

The material comprising Composition X may incorporate, as well as composition X, other optional additives such as hardeners, inert fillers, strength-inducing fibres or whiskers and bio-active materials. Desirably, the material is in the form of granules or pellets having a mean diameter or length greater than 0.5 mm, eg in the range 1 mm to 25 mm. Such pellets may be in the form of spheres, spheroids, cubes, cuboids, cylinders or other suitable shapes. The purpose of using the material in pellet form is to provide large voids between pellets to increase volume loadings in use when added to watercontaining liquor or slurry.

According to the present invention in a second aspect there is provided a method of forming a mass of solid in a volume of water-containing liquor or slurry which comprises the steps of adding pellets of the aforementioned material of Composition X to the liquor or slurry in such quantity that the material may disperse throughout the volume or a substantial layer thereof, allowing the material to become dispersed in the said volume and allowing the material to set to form a mass of solid.

The liquor or slurry may contain hazardous substances, eg radioactive waste material, and may be contained in a suitable container, eg a stainless steel drum. The solid mass formed by the said method may comprise an encapsulating layer or body which suitably seals the contents of the container.

The present invention unexpectedly and beneficially provides a material and a method of using the material which may be used to encapsulate liquors and slurries, especially containing hazardous substances, in containers without the need for expensive and costly mixing of the encapsulant into the slurry or to form a separate encapsulant slurry as is conventionally practised.

Compositions containing Components B, C and D as defined above for use with cements are known in the prior art from U.S. Pat. No. 3,579,366. However, the materials comprising such compositions are to be used as additives with conventional cement powders to reduce shrinkage when the cement sets. Such compositions are added to the cement powder and mixing of the cement with water in the conventional way is still required. Such prior art compositions would be unsuitable to add to cement powder to be used to encapsulate waste liquors without mixing as described herein. This is because the disintegration reaction would already have occurred by the time the waste liquor is added to the cement matrix.

In Composition X, Component A may comprise a suitable known inorganic cementitious material. Such materials generally comprise basic compounds such as oxides, aluminates and silicates of metals such as calcium, magnesium, lead and vanadium. Portland cement, gypsum, high alumina cement or a mixture of these may for example be suitable. Component A is preferably uniformly distributed throughout pellets of Composition X in sufficient quantity to give suitable cementing action when the constituent comes into contact with water.

Component B is an agent which will produce an effect to aid dispersion of solids throughout a liquid medium to facilitate the required reaction between the two. It may comprise one or more salts highly soluble in water eg calcium nitrate and/or sodium carbonate.

Component B may alternatively comprise as a dispersing agent one of the gas liberating materials known in the prior art, the material thereby promoting dispersion of the material of Composition X by gas liberation during use. For example, as in U.S. Pat. No. 3,579,366 the dispersing agent may comprise at least one compound decomposable into at least one gaseous decomposition product at the elevated temperature produced by the heat of reaction when Composition X is in use. Examples of suitable compounds of this type include ammonium carbonate, ammonium bicarbonate and urea. These compounds have the advantage of decomposing entirely into gaseous products, so that no residue is left within the granule composition. These materials may be added to the admixture at any time prior to granulation or pelletization.

In accordance with another mechanism the dispersing agent comprising Component B may take the form of a mixture of compounds, one selected from the group consisting of the carbonate or bicarbonate salts, and the other from the group consisting of mild acids such as citric and tartaric acids. Since mixtures of these compounds begin to react almost immediately, they should be added just prior to granulation or pelletization, so that most of the decomposition into gases will take place during the heating step caused by the heat of reaction obtained during use. Another possible mixture for use as Component B is a finely divided metal, e.g. aluminium particles plus a mild acid such as citric or tartaric acid. Such a mixture will release hydrogen during use.

Component C which may comprise from 5 percent to 50 percent by weight may comprise one or more clays or chemicals such as gum arabic. The purpose of optional Component C is to provide a swelling agent which can absorb water and reduce shrinkage in a controlled manner to produce an acceptable product without cracks thereby allowing greater volumes of liquor or slurry to be satisfactorily encapsulated.

Component D may comprise water and/or one or more water soluble organic liquids, for example one or more of the binders known in the prior art such as compounds which are readily soluble in water and do not react with the other ingredients. Examples of such compounds include stearic acid, cellulose ethers, such as methyl cellulose, ethyl cellulose and carboxy methyl cellulose, polymers and co-polymers of ethylene oxide, carboxy vinyl polymers, polyethylene glycols and polyvinyl alcohols.

In the formation of pellets of materials comprising Composition X, the various component materials, Components A to D plus other optional ingredients, are intermixed or blended together in a blender or mill. Standard granulators or pelletising equipment or plant can be used to manufacture the pellet or granule. After pelleting or granulating, the pellets or granules are treated in such a manner such as by heating to produce the desired properties. Correct proportioning, particle size range of constituents and binding energy will produce a pellet or granule with:

(a) sufficient strength to hold material components together during storage prior to use;

(b) a disintegrating mechanism capable of dispersing the components when in contact with liquor when in use;

(c) a setting and hardening characteristic after dispersion or disintegration in the liquor.

In use, granules or pellets of the material of Composition X may be added by a suitable dispenser to a waste liquor or slurry containing hazardous material held in a suitable container, eg a stainless steel drum. Alternatively, liquor or slurry may be added to the granules or pellets held in a container. After the addition in either case the container is left for a suitable period of time, e.g. 24 to 48 hours, but possibly longer, e.g. up to 7 days, to allow the constituents of the material of Composition X to be dispersed through the liquor or slurry and, by reacting with the water thereof, to set to form a rigidly encapsulated mass. On setting, the encapsulating solid will retain the hazardous material in the container in a manner that will prevent migration or leaching of such material during subsequent transport, disposal or storage of the encapsulated container.

Embodiments of the present invention will now be described by way of example.

EXAMPLE 1

Pellets are made by blending together the following ingredients in the stated percentages followed by pelletising in the manner described above.

20% by weight Portland cement

70% by weight sodium carbonate

10% by weight water (added intermittently)

The pellets produced are heat treated in an oven (at a temperature of up to 250° C. depending on the precise formulation and desired properties) immediately after manufacture and subsequently stored in a manner to avoid deterioration by moisture or carbon dioxide from the air, eg under dry conditions in a silo or in bags.

EXAMPLE 2

Pellets are made in the manner described above by blending together the following ingredients in the following stated percentages followed by pelletising in the manner described above:

90% by weight Portland cement 2.5% by weight citric acid 2.5% by weight sodium carbonate 0.5% by weight binder 4.5% by weight expansion additive (swelling agent)

The pellets after manufacture are heat treated immediately in an oven and stored in a manner to avoid deterioration by moisture or carbon dioxide from the air.

We claim:

1. A grouting material which is self-dispersing when brought into contact with a volume of water-containing liquor or slurry and is settable to a solid mass after such dispersion, the material being in the form of self-dispersing granules or pellets and comprising a Composition X, which comprises a blend of:

Component A: a cementitious constituent forming from 10 percent to 95 percent by weight of the composition;

Component B: a dispersing constituent forming from 2 percent to 75 percent by weight of the composition;

Component C: A binder constituent comprising water, a water soluble organic liquid or mixtures thereof which forms from 0.1 percent to 10 percent by weight of the composition;

the percentages of the constituents adding to 100 percent.

2. The grouting material according to claim 1 which further comprises:

Component D: a swelling constituent which forms from 0 percent to 50 percent by weight of the composition.

3. The grouting material according to claim 1 and wherein Components A, B and D each comprise powders which have mean particle diameters less than 25 micrometers.

4. The grouting material as in claim 1, wherein the granules or pellets have a mean diameter or length, respectively, of greater than 0.5 mm.

5. The grouting material as in claim 1, wherein the waste liquor or slurry contains hazardous material.

6. A grouting material which is self-dispersing when brought into contact with a volume of water-containing liquor or slurry and is settable to a solid mass after such dispersion, the material being in the form of self-dispersing granules or pellets comprising a Composition X, which comprises a blend of:

Component A: Portland cement forming 20 percent by weight of the composition;

Component B: sodium carbonate as a dispersing constituent forming 70 percent by weight of the composition; and Component C: a binder constituent comprising water and forming 10% by weight of the composition.

7. A grouting material which is self-dispersing when brought into contact with a volume of water-containing liquor or slurry and is settable to a solid mass after such dispersion, the material being in the form of self-dispersing granules or pellets comprising a Composition X, which comprises a blend of:

Component A: Portland cement forming 90 percent by weight of the composition;

Component B: a mixture of citric acid and sodium carbonate as a dispersing constituent each forming 2.5 percent by weight of the composition;

Component C: a swelling constituent forming 4.5 percent by weight of the composition; and Component D: a binder constituent forming 0.5 percent by weight of the composition.

8. A method of forming a solid mass in a volume of water-containing liquor or slurry which comprises the steps of:

(1) adding grouting material in the form of self-dispersing granules or pellets to the liquor or slurry in a quantity sufficient to disperse the material throughout the volume or a layer thereof, (2) allowing the material to become dispersed in the said volume, and (3) allowing the material to set to form a mass of solid, wherein the grouting material comprises a Composition X, which comprises a blend of:

Component A: a cementitious constituent forming from 10 percent to 95 percent by weight of the composition;

Component B: a dispersing constituent forming from 2 percent to 75 percent by weight of the composition;

Component C: A binder constituent comprising water, a water soluble organic liquid or mixtures thereof which forms from 0.1 percent to 10 percent by weight of the composition;

the percentages of the constituents adding to 100 percent.

9. The method as in claim 8, wherein the grouting material further comprises:

Component D: a swelling constituent which forms from 0 percent to 50 percent of the composition.

10. The method as in claim 9, wherein the liquor or slurry contains hazardous substances and is contained in a container.

11. The method as in claim 10, wherein the solid mass formed comprises an encapsulating layer which seals the container.

\* \* \* \* \*

UNITED STATES PATENT AND TRADEMARK OFFICE
CERTIFICATE OF CORRECTION

PATENT NO. : 5,707,443
DATED : January 13, 1998
INVENTOR(S) : BROWN et al

It is certified that error appears in the above-identified patent and that said Letters Patent is hereby corrected as shown below:

Cover page item [87] should read -- WO95/07870 --

Column 4, line 36, delete "C" insert --D--.

Column 4, line 43, delete "D" insert --C--.

Column 4, line 45, delete "1" insert --2--.

Column 4, line 46, delete "D" insert --C--.

Column 4, line 64, delete "C" insert --D--.

UNITED STATES PATENT AND TRADEMARK OFFICE
CERTIFICATE OF CORRECTION

PATENT NO. : 5,707,443
DATED : January 13, 1998
INVENTOR(S) : Brown et al

It is certified that error appears in the above-identified patent and that said Letters Patent is hereby corrected as shown below:

Column 5, line 21, delete "or a layer thereof"

Column 5, line 24, delete "mass of solid" insert --solid mass--.

Column 6, line 8, delete "C" insert --D--.

Column 6, line 15, delete "D" insert --C--.

Signed and Sealed this

Tenth Day of November 1998

*Attest:*

*Attesting Officer*

BRUCE LEHMAN
*Commissioner of Patents and Trademarks*